United States Patent

[11] 3,578,148

| [72] | Inventor | Charles P. Pinckard |
| | | 1301 E. Morehead St. Suite 15, Charlotte, N.C. 28204 |
| [21] | Appl. No. | 794,302 |
| [22] | Filed | Jan. 27, 1969 |
| [45] | Patented | May 11, 1971 |
| [73] | Assignee | |

[54] TRAY AND CONVEYOR ASSEMBLY
10 Claims, 10 Drawing Figs.

[52] U.S. Cl. .................................................. 198/181, 186/1
[51] Int. Cl. ................................................. B65g 15/00
[50] Field of Search .......................... 180/1, 1.1; 198/181, 131

[56] References Cited
UNITED STATES PATENTS

| 2,096,959 | 10/1937 | Clerc | 198/181 |
| 2,242,811 | 5/1941 | Bowers | 198/181 |
| 2,342,468 | 2/1944 | Hallwood | 198/181 |
| 3,295,635 | 1/1967 | Cahn | 186/1 |

*Primary Examiner*—Harvey C. Hornsby
*Attorney*—David Rabin

ABSTRACT: A multitiered conveyor tray for facilitating serving tray assembly having a base, side and end walls for retaining articles on each tier level for travel along a directed path of travel on a conveyor to expose selected tiers to various treatment.

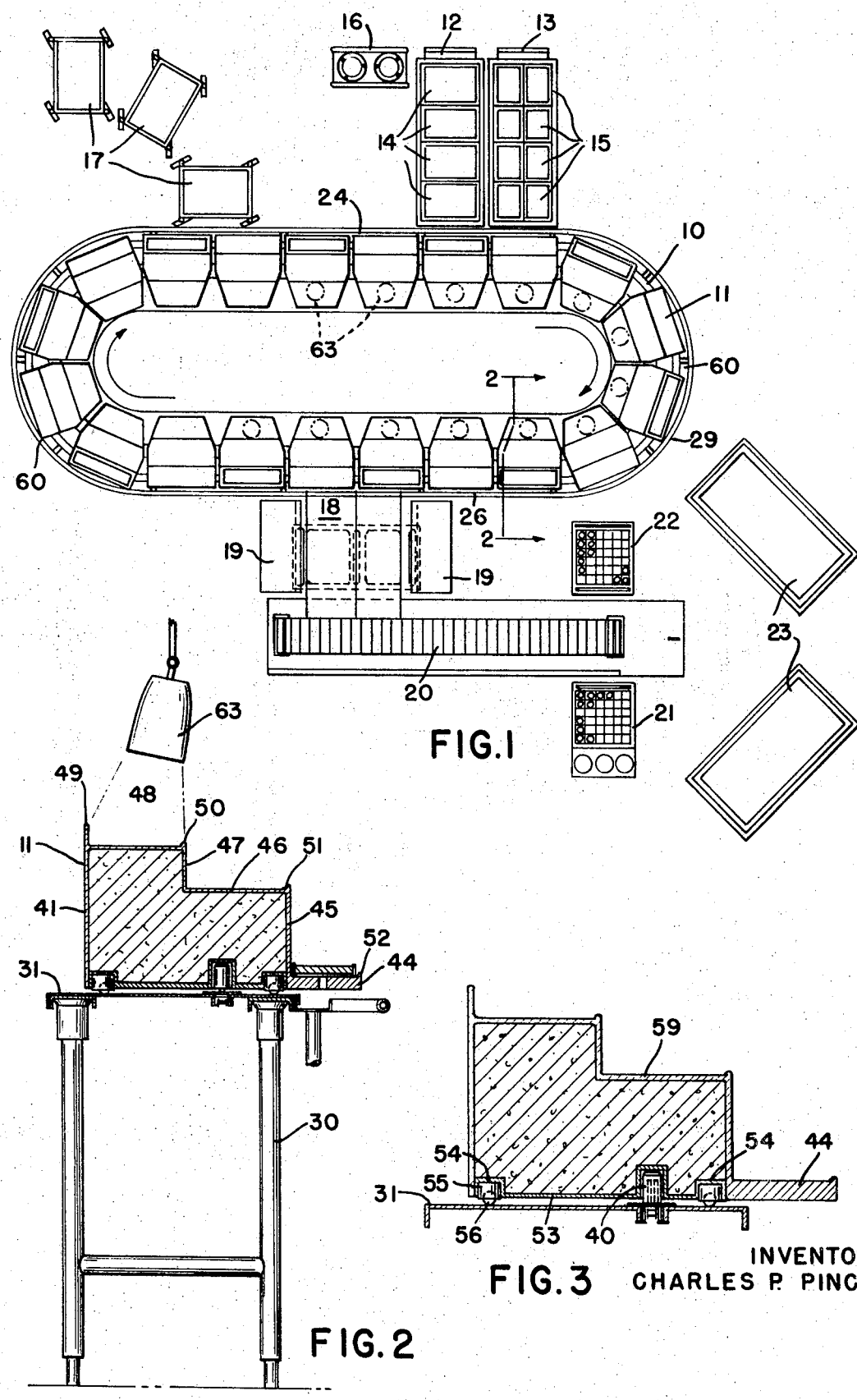

INVENTOR.
CHARLES P. PINCKARD

INVENTOR.
CHARLES P. PINCKARD

TRAY AND CONVEYOR ASSEMBLY

BACKGROUND AND PURPOSES OF INVENTION

Institutional food handling particularly in hospitals requires efficient handling with minimum labor and expense and maximum sanitary conditions with minimum handling. Numerous conveyor systems and various types of serving trays have been attempted but the problems of food selection and accelerated handling have not been alleviated. It is desirable to provide a hospital patient with selected hot plates on the same serving tray with cold dishes but where several hundred patients are to be served, the problems are compounded. Furthermore, it is most desirable to have the various trays for preserving tray assembly divided or oriented so that certain portions may be heated while other portions may remain at room temperature. The rapid selection by an operator of the various dishes for serving tray make-up is also essential. Of further significance, the tray assembly unit must be designed for longevity, be light in weight, and satisfy maximum sanitation requirements.

Various types of food serving conveyors of an endless configuration are well known in the food serving technology such as shown in U.S. Pat. No. 2,666,519 and 2,745,542. However, little or no attention has been directed to maintaining several levels of food serving so that at least one level may be subjected to heated areas to maintain the plate and contents thereon at an elevated temperature while other levels are maintained at other temperatures.

Therefore, it is an objective of this invention to provide a multitiered movable platform and conveyor for utilization in the assembly of serving food trays for hospitals and other institutions and to maintain a continuously moving supply of predished food items for operator selection in assembling serving food trays for dispatch to a cart ultimately for serving a patient.

Another objective of this invention is the provision of a tray platform having several stepped levels in which one or more levels may be subjected to elevated temperatures to maintain dishes and foods at an elevated temperature preliminary to dispensing or selecting the individual dishes for positioning on a service food tray to be dispensed to a patient at a remote location.

Still another objective of this invention is the provision of a unitary multitiered assembly tray or platform and a conveyor for displacing the platform along a directed path of travel with the platform being readily removed for closing with a minimum of effort and the construction of the platform being such as to be capable of cleansing with a minimum of effort.

BRIEF DESCRIPTION OF DRAWINGS

A preferred embodiment of this invention including a tray platform and conveyor system will be more readily understood from the following detailed description taken in conjunction with the accompanying drawings in which like characters of reference designate corresponding parts throughout the several views, and wherein:

FIG. 1 is a top plan view of a conveyor system using a plurality of tray platforms and illustrating several service stations embodying this invention;

FIG. 2 is an enlarged transverse sectional view taken along the plane of section line 2-2 of FIG. 1;

FIG. 3 is an enlarged transverse sectional view of a tray platform of FIG. 2;

DETAILED DESCRIPTION OF PREFERRED EMBODIMENT

Figure 4:
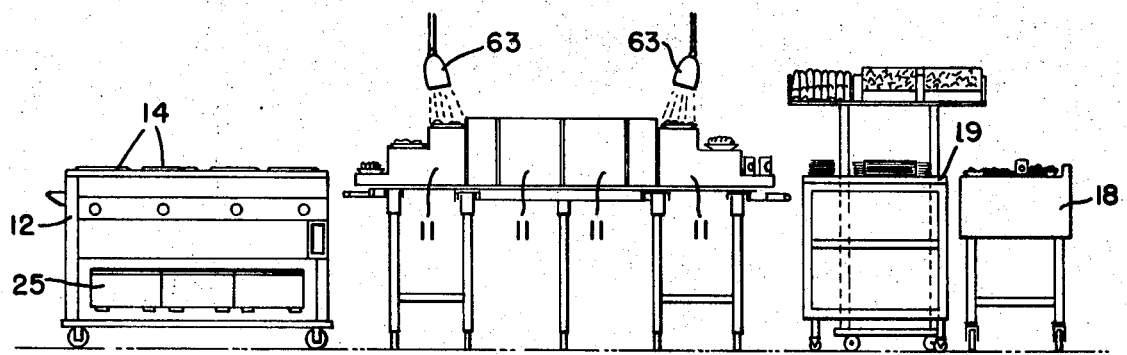
FIG. 4 is an intermediate elevational view substantially intermediate the ends of the conveyor in FIG. 1 illustrating replenishment and tray make-up carts in position relative to the conveyor on which the tray platforms are positioned.
Figure 5:
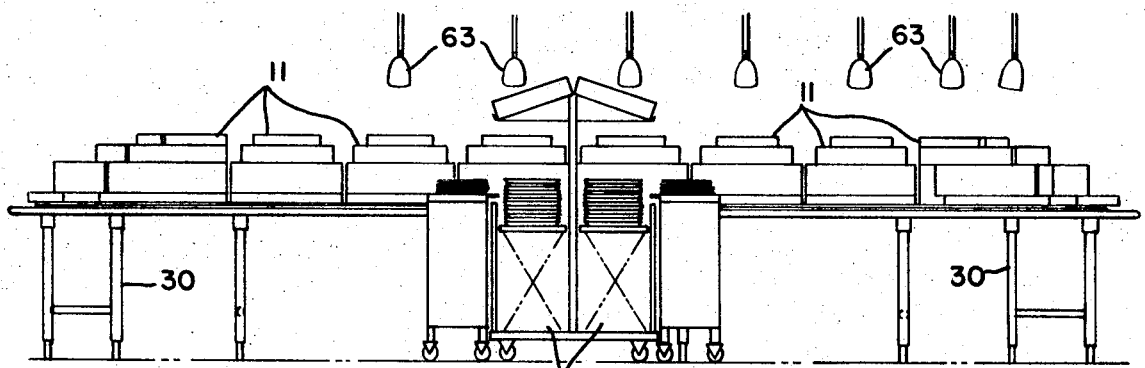
FIG. 5 is a partial longitudinal elevational view of an intermediate portion of the conveyor with the tray platforms positioned adjacent to each other.

Referring to the drawings and particularly to FIGS. 1, 2, 4 and 5, there is illustrated an arrangement including a continuously traveling conveyor 10 for supporting and displacing a series of multitiered tray platforms 11 in a directed path of travel closely adjacent to movable carts 12 and 13 on which there are individual compartments 14 and 15 for retaining hot food delivered from the kitchen. A portable plate dispenser 16 accessible to a server-operator is positioned closely adjacent to the carts 12 and 13 for ready access. Several salad, dessert and beverage replacement carts 17 are positioned in spaced relation to the conveyor 10 and the carts 12 and 13 for access to the same server-operator or to another server-operator. On the opposite side of the conveyor from the carts 12 and 13 are a portable tray setup unit 18, a pair of spaced-apart portable make-up stands 19, a portable tray conveyor 20, a portable cup and saucer support and dispensing unit 21, a portable glass supporting unit 22, and movable tray-receiving carts 23 for delivery of trays to patients or others at a remote location.

As illustrated in FIG. 4, the individual hot food dish-up compartments 14 supported on the movable hot plate cart 12 positioned adjacent to one straight reach 24 of the conveyor 10 may be displaced periodically for replenishment either of an entire cart or the individual trays 14. Additional capacity for hot foods is retained in the bottom of cart 12 in the compartments 25. At the opposite side of the conveyor along the straight reach 26 thereof may be positioned one or more make-up trays 19 and a portable setup unit 18 which will include silverware, napkins, and condiment packets as wheel as placemats and patient service trays and menus.

The various portable carts are provided with casters or rollers facilitating ready displacement from the conveyor to permit cleaning before and after each service period.

The oval-shaped conveyor supporting table 29 is supported a suitable distance above the floor by means of the H-shaped standards or supports 30 on which an elliptical table top 31 is positioned for cooperatively supporting thereon a series of individual, removable platform tray members 11 each of which will be displaced by a flat link chain conveyor belt 32 of conventional construction with the conveyor belt being driven at a desired linear speed by interconnected sprockets 33, 34 and 35, by belts or other suitable means, with the sprockets being driven by a variable speed motor 36. The conveyor belt of flexible-link construction with an integral roller chain type linkage will be sufficiently flexible to negotiate the curvature of the table 31 at opposite ends thereof. Tray platform displacing lugs 37 and 38 are securely fastened to the conveyor belt 32 and are sufficiently spaced apart to receive and position for displacement a tray platform 11 thereon as will be described hereafter. An intermediate guide lug 39 is securely mounted to the conveyor belt preferably closer to the trailing lug 38 to facilitate guiding of the tray platform around a curvilinear section of the conveyor table 31. A rotatable sleeve member 40 of plastic or other suitable material is positioned over each of the lugs 37, 38 and 39.

The individual tray platform member 11 is preferably a molded plastic body having suitable heat resistant characteristics to withstand elevated temperatures although the body may be made of other suitable materials that may be readily cleansed. The tray platform 11 is provided with an integral upper shell having a rear wall 41, parallel sidewall sections 42 and converging sidewall sections 43, a forwardly projecting cantilever article-supporting tier or shelf 44, a vertical front wall section 45 extending from the shelf 44, a second horizontal tier or shelf 46 set back from the vertical front wall section 45, a second front wall section 47 set back from the section 45, and an upper tier or shelf 48 extending between section 47 and the rear wall 41. It is desirable to have upwardly extending ledges or lips 49, 50, 51 and 52 all of which extend vertically a suitable distance at each of the tiers 48, 46, and 44 to prevent accidental dislodgement therefrom. It is desirable that when the tray platform body 11 is made of plastic material, various color combinations may be used to designate particular foods and diets for various patients. The bottom of the tray platform 11 is enclosed by a base member 53 which is either frictionally retained between the front and rear walls 45 and 41 or securely retained by suitable means. Base 53 is provided with a number of spaced-apart caster or roller-receiving cavities 54 for cooperatively receiving a bearing housing 55 therein from which a ball bearing or caster 56 projects for rolling engagement with the top surface of the table 31 as shown in FIG. 3. A longitudinal recess 57 may be molded or otherwise formed in the plastic base 53 to receive cooperatively therein the drive and guide lugs 37, 38 and 39, and the rotatable sleeve members 40 positioned on the lugs to displace and guide each of the tray platform bodies in a directed path of travel.

Figure 6:
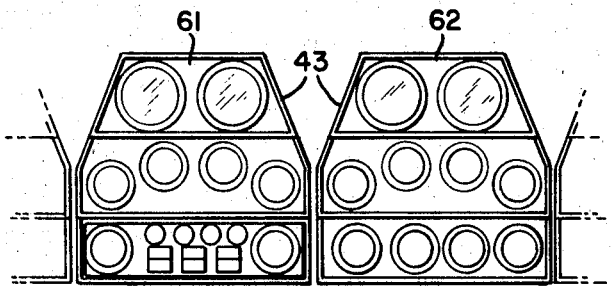
FIG. 6 is a top plan view of tray platforms with dishes and articles stacked on each level.
Figure 7:
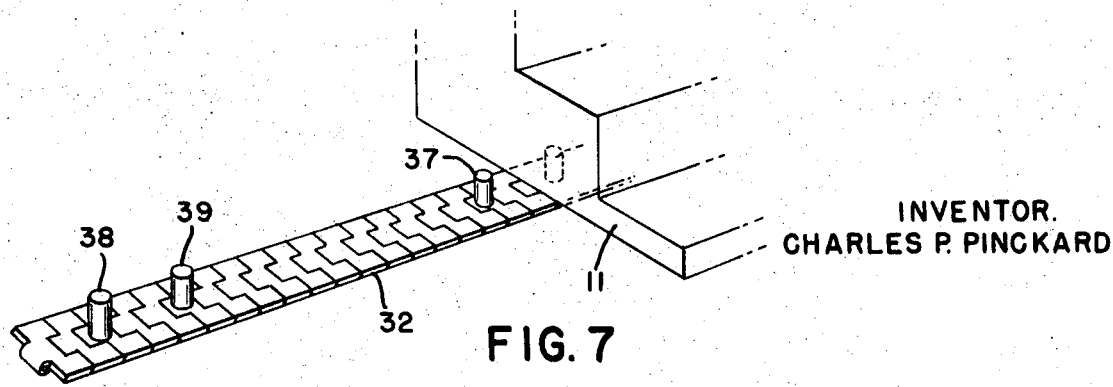
FIG. 7 is a partial perspective view of a portion of a conveyor for displacing the tray platforms with the outline of a tray platform.
Figure 8:
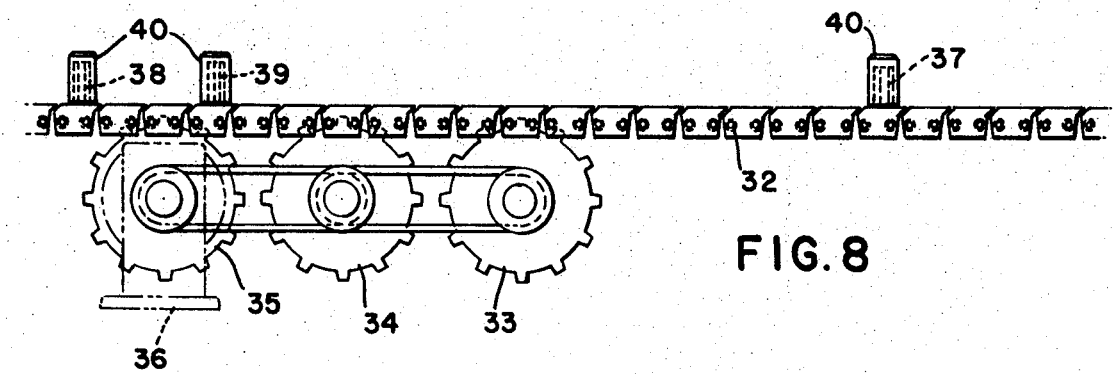
FIG. 8 is partial side views of the conveyor and drive mechanism.
Figure 9:
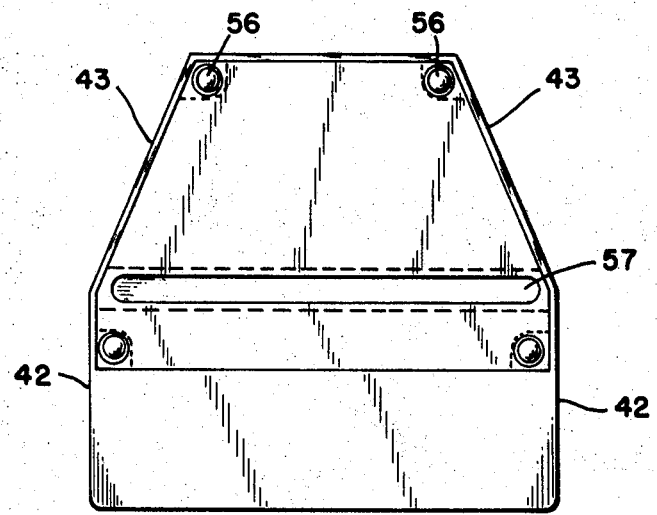
FIG. 9 is a bottom plan view of a tray platform.
Figure 10:
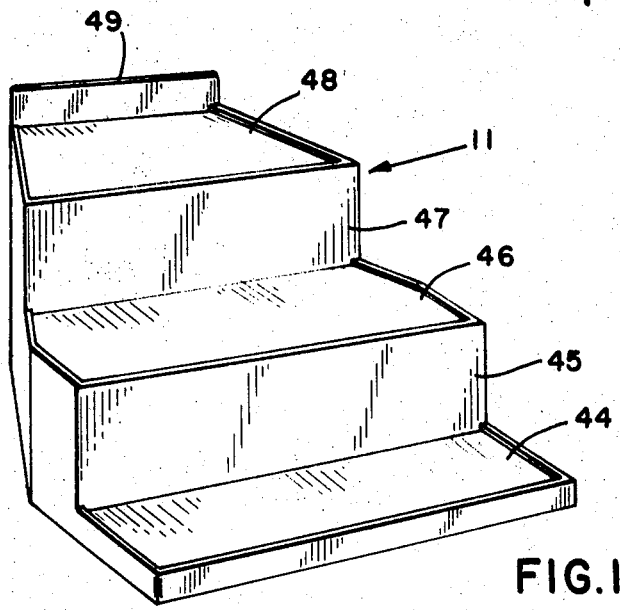
FIG. 10 is a front perspective view of one preferred form of a tray platform.

In order to provide increased stability to the tray platform shell or body when made of plastic or Fiberglas, and to deaden sound, the hollow interior may be filled with a suitable polyurethane foam 59 whether prefabricated or foamed in place. It is desirable that the sidewall converging sections 43 converge suitably to permit the tray platforms to travel around the curved or circular ends 60 of the table 31 in a compact manner so that the adjacent tray platform members may be contiguous to each other along their corresponding sidewall sections 43 as shown in FIG. 1. The layout of the individual tray platforms may vary considerably as shown in FIG. 6 for the tray platform bodies 61 and 62 with the arrangement of the plates and other articles being positioned by a server-operator depending upon the sequence of operations finalized for dispensing the individual plates to a patient's tray. If desirable, an upturned flange corresponding to the flanges 49 through 52 may be provided on the upper ends of the sidewall sections 42 and 43.

A series of depending infrared or other heat lamps 63 are strategically positioned to radiate and heat the top tier or level 48 on each of the tray platform members 11 with as many units 63 being utilized as may be necessary taking into consideration the length of travel for each tray platform as well as the rate of travel from the time the hot food is placed in position to the time the plate is removed and placed on a tray for delivery to a patient.

The individual tray platforms are comparatively light in weight and durable while permitting ready removal from the conveyor for cleansing and maintenance should any be necessary. The specific size of the individual tray platforms as well as the length and width of the tiers will vary depending upon the particular requirements taking into consideration that the individual tray platforms may be introduced into readily available commercial dishwashing machinery.

It will be readily recognized that the conveyor belt may be of conventional construction and it does not, per se, constitute a part of this invention. Suitable hold-down fixtures will be provided in order to prevent the sprockets from exerting an upward force on the belt to dislodge it from position on the table.

I claim:

1. A portable, lightweight tray platform for a conveyor comprising: a horizontally disposed base, a plurality of stepped horizontal tiers supported on said base for retaining articles thereon, said tiers being horizontally and vertically spaced from each other such that there is no overlapping of the tiers, vertically disposed sections interconnecting and supporting adjacent tiers, said vertically disposed sections being horizontally and vertically spaced from each other, and means on said base for supporting independently said tray for displacement in straight and curved paths of travel along a surface.

2. A tray platform for a conveyor as claimed in claim 1, rear and sidewalls and said vertically disposed sections on said tray forming a hollow interior with said tiers, said base enclosing the bottom of the tray platform.

3. A tray platform for a conveyor as claimed in claim 1, rear and sidewalls and said vertically disposed sections forming a hollow interior with said stepped horizontal tiers, said sidewalls converging partially toward each other intermediate the stepped tiers to permit contiguous tray alignment of a plurality of tray platforms traveling around a curved path of travel.

4. A tray platform for a conveyor as claimed in claim 1, each of said tiers having upwardly extending means for retaining articles on said tiers in selected portions thereof, one of said plurality of tiers being cantilevered with respect to said base.

5. A tray platform for a conveyor as claimed in claim 1, said base having a tray-receiving displacing lug recess formed therein.

6. A tray platform as claimed in claim 1, a foam material retained as backing for said stepped horizontal tiers.

7. A tray platform for a conveyor as claimed in claim 2, and a sound deadening material contained within said interior.

8. A tray platform as claimed in claim 2, and a foam material in said hollow interior for deadening sound.

9. A tray platform for a conveyor as claimed in claim 2, said stepped horizontal tiers, rear and sidewalls being of integral construction of plastic material.

10. A tray platform as claimed in claim 9, said stepped tiers being vertically and horizontally spaced apart to receive heat from an overhead heat source on a selected tier to heat articles supported thereon.